US011059276B2

(12) United States Patent
Kolar et al.

(10) Patent No.: US 11,059,276 B2
(45) Date of Patent: Jul. 13, 2021

(54) RELEASE FILM FOR GRAVURE APPLICATION

(71) Applicant: Mitsubishi Polyester Film GmbH, Weisbaden (DE)

(72) Inventors: Petr Kolar, Eschborn (DE); Claudia Lohre, Wiesbaden (DE); Yavuz Ünker, Nieder-Olm (DE); Matthias Konrad, Kriftel (DE); Stefan Bartsch, Mainz (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 41 days.

(21) Appl. No.: 16/299,458

(22) Filed: Mar. 12, 2019

(65) Prior Publication Data
US 2019/0284433 A1 Sep. 19, 2019

(30) Foreign Application Priority Data

Mar. 13, 2018 (DE) .......................... 102018105735.0

(51) Int. Cl.
*B32B 27/36* (2006.01)
*B32B 33/00* (2006.01)
*B32B 27/08* (2006.01)

(52) U.S. Cl.
CPC .............. *B32B 33/00* (2013.01); *B32B 27/08* (2013.01); *B32B 27/36* (2013.01)

(58) Field of Classification Search
CPC . C09D 191/06; C09D 7/40; Y10T 428/31786; Y10T 428/31801
USPC ....................................................... 428/202
See application file for complete search history.

(56) References Cited

U.S. PATENT DOCUMENTS

| 5,302,459 A | 4/1994 | Kim et al. |
| 5,407,724 A | 4/1995 | Mimura et al. |
| 2002/0058758 A1* | 5/2002 | Culbertson .......... C09D 123/02 525/191 |

FOREIGN PATENT DOCUMENTS

| DE | 10349963 A1 | 6/2005 |
| EP | 1186643 A1 | 3/2002 |
| EP | 2163394 A1 | 3/2010 |
| EP | 2172347 A2 | 4/2010 |
| WO | 2007048563 A2 | 5/2007 |
| WO | 2016/025563 A1 | 2/2016 |
| WO | 2016150681 A1 | 9/2016 |
| WO | 2017021461 A1 | 2/2017 |
| WO | 2017102744 A1 | 6/2017 |

OTHER PUBLICATIONS

Wacker Crosslinker V72 (Year: 2020).*
W. Rabel, Einige Aspekte der Benetzungstheorie und ihre Anwendung auf die Untersuchung und Veranderung der Oberflächeneigenschaften von Polymeren [Some aspects of wetting theory and their application to investigating and modifying the surface properties of polymers], in: Farbe und Lack 77, 10 (1971), pp. 997-1005. Machine translation supplied.
FINAT Technical Handbook: Test methods, 8th edition, The Hague; 2009, p. 73.
Encyclopedia of Polymer Science and Engineering, vol. 12, second edition, 1988, e.g., pp. 193-216.
PET Packaging Technology, edited by David W. Brooks and Geoff A. Giles, Sheffield Academic Press 2002 (ISBN 0-8493-9786-3), e.g., pp. 116-157.

* cited by examiner

*Primary Examiner* — Betelhem Shewareged
(74) *Attorney, Agent, or Firm* — ProPat, L.L.C.; Vinisha Joshi

(57) ABSTRACT

The present invention relates to biaxially oriented polyester films having a release coating of polyolefin wax on at least one side as release film for applying thin polyacrylate layers from organic solvents by means of a printing process. The invention further relates to a method for producing such films and also to their use.

15 Claims, No Drawings

RELEASE FILM FOR GRAVURE APPLICATION

CROSS-REFERENCE TO RELATED APPLICATIONS

This application claims priority to German Patent Application 10 2018 105 735.0 filed Mar. 13, 2018, which is hereby incorporated herein by reference in its entirety.

FIELD OF THE INVENTION

The invention relates to a softly detaching coated release film of polyester for applying thin polyacrylate layers from organic solvents by a printing process, and also to a method for producing said film and to the use thereof.

BACKGROUND OF THE INVENTION

Polyester films, particularly biaxially oriented polyester films, which consist predominantly of polyethylene terephthalate (hereinafter PET), are very suitable as detachable release films for the application (casting) of thin layers of polymers (e.g., polyvinyl chloride, polyacrylates) from organic solvents. In the course of this operation the polymers are cured typically by evaporation of the solvent and drying of the polymer layer at temperatures below 200° C. on a continuous roll-to-roll line. The release film is subsequently detached mechanically from the dried polymer layer. Because of the high stiffness and the surface nature of the polyester substrate, release is achieved in a simple way and without surface defects. The release film taken off can be used again repeatedly in the casting operation. Examples of this process include the casting of decorative layers for various industrial applications (automobile, furniture, machine industries, etc.).

Particularly thin and precise polymer layers (with a dry film thickness of several hundred nanometers) of polyacrylate-based varnishes for advertising and packaging industries can be efficiently applied by a printing process on high-speed lines.

EP2172347, EP2163394, WO2016150681 and WO2017021461 describe the construction and the printing process for producing multilayer transfer films for cold embossing that consist of a decorative transfer ply and a release film which is detachable softly at room temperature. The decorative layer in the transfer ply is provided with a micrometer-thick protective varnish layer of polyacrylates on the release film side. The quality of this surface after the removal of the release film is of particular interest: detachment of the release film must not cause any damage to the transfer ply or submicrometer-thick decorative layer and must therefore take place with constant and very low forces. Because of their chemical similarity, the application of the polyacrylate-based protective varnishes directly to the surface of a release film made of uncoated polyester leads to high and nonuniform detachment forces. An improvement in the detachment forces cannot be achieved by using corona methods to treat the surface of the polyester film.

WO2007048563 and WO2017102744 describe the use of an additional detachment layer between the release film and the transfer ply, said layer consisting of a warlike material.

Furthermore, DE10349963 describes the use of an ester wax having a dropping point of 90° C., in which case the warlike material softens only on heating and then the release film can be detached. This technique, however, is not suitable for detaching the release film in the case of cold embossing, since the latter process takes place at room temperature. WO2017021461 describes the use of an additional detachment layer composed of a polyacrylate copolymer, particularly an aqueous polyurethane copolymer, between the transfer ply and the release film for cold embossing. The attachment and drying of this detachment layer, however, require additional operating steps.

An alternative possibility is to use coated polyester release films. Polyester release films with a silicone coating are known and are available commercially as protective films for polyacrylate-based adhesive layers—examples include labels, high-performance customer-specific pressure-sensitive adhesive (PSA) tapes, decorative laminates, and adhesive transfer tapes. A polyacrylate-based adhesive layer releases from these surfaces with only minimal force. Because of the high hydrophobicity of the siliconized surface, however, the wetting of siliconized films with liquid polyacrylate varnishes in organic solvents is incomplete and therefore disadvantageous.

EP 1186643 evaluates the state of the art in the development of a silicon-free release coating for polyester films. It proposes a mixture of a polyolefin wax and a cross linkable acrylic polymer, this mixture optionally also comprising a polysiloxane or a silane. The polyolefin wax said to be preferred is an oxidized homopolymer of ethylene wax, ME18325, from Michelman. The covering of release coatings comprising acrylic resins with polyacrylates in organic solvents results, however, in strong detachment forces after the drying of the varnish layer, owing to the chemical similarity, and this is undesirable.

In contrast to a conventional coating process for films that is aimed at covering the film surface extensively, the wetting in the case of a printing process is punctuate. In a printing process it is important to ensure sufficient wetting of the film surface with the polymer-containing solution on the micrometer scale. A measurement of the contact angle may be utilized as a measure of the wettability of the film surface.

SUMMARY OF ADVANTAGEOUS EMBODIMENTS OF THE INVENTION

It was therefore an object of the present invention to provide a polyester film which is suitable as a release film for the application of thin polyacrylate layers from organic solvents by a printing process, the dried polyacrylate layer being subsequently detachable/releasable with low and uniform forces at room temperature and without residue.

The object is achieved according to the invention by the provision of a polyester film which is equipped on at least one side with a release coating (i.e., coated release film) wherein the release coating represents the product of drying of an aqueous coating dispersion.

DETAILED DESCRIPTION OF ADVANTAGEOUS EMBODIMENTS OF THE INVENTION

The polyester film according to the invention is comprised of, on at least one side, with a release coating (i.e., coated release film) wherein the release coating represents the product of drying of an aqueous coating dispersion, and the aqueous coating dispersion applied to the polyester substrate comprises the following components:
(I) 2 to 10% by weight (based on the total weight of the aqueous coating dispersion) of a polyolefin wax having an O/C ratio of 5 to 15 atomic %, where 0 denotes the oxygen content and C the carbon content, and (II) 0.05 to 1.4% by weight (based on the total weight of the aqueous coating dispersion) of a crosslinker, where the mass ratio of the crosslinker to the polyolefin wax (I) is not more than 1:7, and/or (III) 0.05 to 2.5% by weight (based on the total weight of the aqueous coating dispersion) of a silicone-containing component, where the mass ratio of the silicone-containing component to the polyolefin wax (I) is not more than 1:4, and (IV) water (as continuous phase) for the remaining % by weight (based on the total weight of the aqueous coating dispersion) to make 100% by weight.

The properties of the coated film surface are as follows:

The wetting angle between the coated film surface and the solvent or solvent mixture in which the polyacrylate has been dissolved for application is <10°.

The free surface energy $\sigma_s$ (total) and its disperse and polar components $\sigma_{s,D}$ and $\sigma_{s,P}$ of the coated film surface, determined by measurement of the contact angle of three standard liquids (water, 1,5-pentanediol, and diiodomethane) on the coated release film, are as follows:

free surface energy $\sigma_s$ (total): 15 to 30 mN/m, preferably from 20 to 30 mN/m, more preferably from 25 to 30 mN/m;

disperse component of the free surface energy $\sigma_{s,D}$: 15 to 30 mN/m, preferably from 20 to 30 mN/m, more preferably from 25 to 30 mN/m;

polar component of the free surface energy $\sigma_{s,P}$: from >0 to 2.0 mN/m, preferably from 0.3 to 1.5 mN/m, more preferably from 0.5 to 1 mN/m.

Further properties of the coated polyester film of the invention are as follows:

a wettability for polyacrylates in organic solvents that is better than or at least comparable with that of an uncoated polyester film, and simultaneously a detachment force on removal of the dried polyacrylate layer that is less than that of an uncoated polyester film having the same film thickness.

The wettability and the detachment force here are determined as indicated below under "Test methods".

The polyolefin wax with an O/C ratio of 5 to 15 atomic % is the component which ensures high wettability of the coated polyester film surface for polyacrylate dispersions which are applied from organic solvents. If the 0/C ratio in the polyolefin wax is less than 5 atomic %, the chemical nature of the polyolefin wax and of the polymer substrate will cause the release coating not to adhere sufficiently to the polyester substrate. In that case the release coating detaches from the polyester substrate during removal of the dried polyacrylate coating, and remains on the decorative surface. If the 0/C ratio in the polyolefin wax is greater than 15 atomic %, the quality of the dried release coating when the polyacrylate coating is applied from organic solvents is impaired because the aprotic polar solvent dissolves the polyolefin wax. Preference is given to aqueous dispersions of partially oxidized waxes based on polypropylene and/or polyethylene. Such polyolefin waxes are available, for example, from Michelman, Aubange, Belgium (EIF1312.E; partially oxidized homopolymeric polypropylene wax) or from BYK-Chemie GmbH, Wesel, Germany (AQUACER® 1547; anionic emulsion of an oxidized polyethylene wax). Other polyolefin waxes may be used either individually or in combination with other waxes such as paraffin waxes and/or natural waxes. In the coating dispersion the polyolefin wax is present in the concentration range from 2 to 10% by weight, preferably in the concentration range from 2.3 to 5% by weight, more preferably in the concentration range from 2.5 to 4.5% by weight. If the polyolefin wax is used at more than 10% by weight, the result is an increased viscosity on the part of the coating dispersion and, as a result of that, processing problems. If the polyolefin wax is used at less than 2% by weight, the economics (because of the necessity to evaporate the great majority of water during the drying of the release coating) and the technical practicability (because of limited accuracy of precision metering at very low concentrations) are impaired.

Additionally, the coating dispersion is admixed with a crosslinker in a concentration of 0.05 to 1.4% by weight, preferably in a concentration of 0.1 to 0.7% by weight, and more preferably in a concentration of 0.3 to 0.6% by weight. Through self-crosslinking, the crosslinker ensures a firm consistency of the release coating and reduces the risk of partial transfer of the polyolefin wax from the release coating onto the reverse face of the wound film (setoff). The crosslinker, furthermore, improves the stability of the dried release coating with respect to organic solvents on application of the polyacrylate solution. The crosslinker is added to the coating dispersion (to the polyolefin wax) in a mass ratio of not more than 1:7 (crosslinker:polyolefin wax). At mass ratios of the crosslinker to the polyolefin wax of more than 1:7, the coated film surface will not achieve the wetting angles or surface energies according to the invention. In the case of polyolefin waxes which without the use of a crosslinker tend only to a low level of setoff, it has proven favorable to orient the concentration of the crosslinker toward the lower limit of the inventive range (0.05 to 0.1% by weight). Preferred crosslinkers are those which undergo self-crosslinking at the setting temperatures in film production (typically 190-240° C.). Particularly preferred are the oxazoline-based crosslinkers such as EPOCROS® WS-700 from Nippon Shokubai Co. Ltd., Osaka, Japan. The crosslinker may also be a hydrolyzable silane, such as XIAMETER® OFS-6020 from Dow Corning S.A., Seneffe, Belgium. It is possible, moreover, to use melamine-based crosslinkers such as CYMEL® 303 LF from Cytec Industries B.V., Vlaardingen, the Netherlands. When using melamine-based crosslinkers it has proven favorable to orient the crosslinker concentration toward the lower limit of the inventive range (0.05 to 0.1% by weight), since a high melamine content (nitrogen fraction) can lead to yellowing of the film regrind. If a silicone-containing component is used, it is also possible to forego the crosslinker.

Additionally or alternatively to the crosslinker, the coating dispersion is admixed with a silicone-containing component at 0.05 to 2.5% by weight, preferably at 0.1 to 1.2% by weight, and more preferably at 0.3 to 1.1% by weight. This is beneficial, in the case of certain solvent-based acrylate systems, on the detachability of the coated release film from the dried polyacrylate layer (the dried acrylate system). The silicon-containing component is used preferably in aqueously dispersed form. Particularly suitable in this context is an aqueous emulsion of synthetic resins and siloxanes which comprises 3-(polyoxyethylene)propylheptamethyltrisiloxane as interface-active substance and which is available commercially from, for example, Jost Chemicals GmbH, Lauterbach, Germany (AQUA RELEASE® 470 V67). Other siloxanes containing methylvinylsiloxane and methylhydrogensiloxane groups may likewise be used either individually or as a mixture. The silicone-containing component is added to the coating dispersion (to the polyolefin wax) in a mass ratio of not more than 1:4 (silicone-containing component: polyolefin wax). At mass ratios of the silicone-containing component to the polyolefin wax of more than 1:4, wetting of the film surface with polyacrylates in organic solvents is incomplete. In the case of acrylate systems in which the polyolefin wax leads to sufficient detachability of the dried acrylate coating, it is also possible to forego the silicone-containing component.

The dispersion whose product of drying forms the release coating is preferably represented by an aqueous dispersion. The individual components of the coating dispersion may be introduced together and then dispersed, or introduced having already been individually predispersed, and mixed before being used. To improve the dispersion stability and/or the solubility of the respective components, the above-described aqueous dispersion may include a certain fraction of alcohols (such as ethanol or 2-propanol) and/or amines (such as 2-diethylaminoethanol) in the continuous phase. Further additives (e.g., surfactants, defoamers, stabilizers, pH buffers, etc.) may be added to the coating dispersion. The total concentration of additives is not more than 2.1% by weight based on the total weight of the aqueous dispersion.

The solids content of the complete coating dispersion ought to be 2.05 to 16% by weight, preferably 2.5 to 9% by weight, more preferably 3 to 6% by weight. At high solids contents, the coating dispersions tend to form foam and tend toward partial transfer of the dried coating onto the reverse face of the wound film. Solids contents of less than 2.05% by weight in the coating dispersion may result in incomplete coverage of the film surface with the dried release coating. The polyester film of the invention with the release coating is particularly suitable for the application of thin polyacrylate layers from organic solvents by a printing process—for example, gravure, flexographic, offset, and inkjet printing, and so on. The polyacrylate dispersions comprise solutions of polyacrylate copolymers (e.g., polymethyl methacrylate copolymers) and/or polyurethane copolymers in organic solvents. The organic solvents consist, for example, of aprotic polar solvents, ideally of methyl ethyl ketone (hereinafter MEK) and/or of ethyl acetate or mixtures thereof. It has additionally proven favorable if one or more phase mediators, such as ethanol, glycols (e.g., n-propylglycol, 1-methoxy-2-propyl acetate, ethyl lactate, and the like) and cellulose derivatives (e.g. nitrocellulose, acetylcellulose, and the like), either individually or in mixtures thereof, are added.

The polyester film of the invention to which the release coating is applied is a single-layer or multilayer biaxially oriented polyester film and consists of thermoplastic polyester to an extent of at least 80% by weight. Polyesters suitable for this purpose are those formed from ethylene glycol and terephthalic acid (i.e., polyethylene terephthalate, PET), from ethylene glycol and naphthalene-2,6-dicarboxylic acid (i.e., polyethylene 2,6-naphthalate, PEN), from 1,4-bishydroxymethylcyclohexane and terephthalic acid (i.e., poly-1,4-cyclohexanedimethylene terephthalate, PCDT), and from ethylene glycol, naphthalene-2,6-dicarboxylic acid, and biphenyl-4,4'-dicarboxylic acid (i.e., polyethylene 2,6-naphthalate bibenzoate, PENBB). Preferred polyesters are those comprising ethylene units and consisting—based on the dicarboxylate units—of at least 90 mol %, more preferably at least 95 mol %, of terephthalate or 2,6-naphthalate units. The remaining monomer units originate from other dicarboxylic acids (see below). Advantageously for the polyester film it is also possible to use copolymers or mixtures or blends of the stated homopolymers and/or copolymers (when the quantities are stated for the dicarboxylic acids, the total amount of all dicarboxylic acids is 100 mol %. Similarly, the total amount of all diols is also 100 mol %).

Suitable other aromatic dicarboxylic acids are preferably benzenedicarboxylic acids, naphthalenedicarboxylic acids (for example, naphthalene-1,4-dicarboxylic acid or naphthalene-1,6-dicarboxylic acid), biphenyl-x,x'-dicarboxylic acids (especially biphenyl-4,4'-dicarboxylic acid), diphenylacetylene-x,x'-dicarboxylic acids (especially diphenylacetylene-4,4'-dicarboxylic acid), or stilbene-x,x'-dicarboxylic acids. The cycloaliphatic dicarboxylic acids include cyclohexanedicarboxylic acids (especially cyclohexane-1,4-dicarboxylic acid). Among the aliphatic dicarboxylic acids, particular suitability is possessed by the (C3-C19) alkanedioic acids, in which the alkane moiety may be straight-chain or branched. Heterocyclic dicarboxylic acids include, in particular, 2,5-furandicarboxylic acid.

Examples of suitable aliphatic diols, apart from polyethylene glycol are diethylene glycol, triethylene glycol, aliphatic glycols of the general formula HO—$(CH_2)_n$—OH, where n is an integer from 3 to 6 (especially propane-1,3-diol, butane-1,4-diol, pentane-1,5-diol, and hexane-1,6-diol), or branched aliphatic glycols having up to 6 carbon atoms, and cycloaliphatic, optionally heteroatom-containing diols having one or more rings. The cycloaliphatic diols include cyclohexanediols (especially cyclohexane-1,4-diol). Suitable other aromatic diols conform for example to the formula HO—$C_6H_4$—X—$C_6H_4$—OH, where X is —$CH_2$—, —$C(CH_3)_2$—, —$C(CF_3)_2$—, —O—, —S— or —$SO_2$—. Additionally, bisphenols of the formula HO—$C_6H_4$—$C_6H_4$—OH are also suitable.

The polyester film of the invention may also be constructed from a copolyester whose dicarboxylic components can be traced back to units derived from terephthalic acid, plus a small amount (<5 mol % of acid units) of units derived from isophthalic acid. The polyester film then substantially comprises a polyester copolymer which is composed predominantly of terephthalic acid and isophthalic acid units and of ethylene glycol units (>97 mol % of diol units).

The polyesters may be produced by the transesterification process. In that case the starting materials are dicarboxylic esters and diols, which are reacted with the customary transesterification catalysts, such as salts of zinc, of calcium, of lithium, and of manganese. The intermediates are then subjected to polycondensation in the presence of commonplace polycondensation catalysts, such as antimony trioxide, titanium oxide, and also germanium compounds. Production may also take place effectively by the direct esterification method in the presence of polycondensation catalysts. In that case the starting materials are the dicarboxylic acids and the diols directly.

The polyester film used in accordance with the invention has a thickness of 4.5 µm to 500 µm, preferably of 8 µm to 75 µm, and more preferably of 10 µm to 36 µm, and consists of at least one, or two or more, polyester layer(s), with the multilayer films being brought together preferably by coextrusion or lamination. The polyester film, or each of the layers of a multilayer film, may comprise conventional additives such as antioxidants, pigments, dyes, antistats, UV stabilizers and light stabilizers, flame retardants, antiblocking agents, and fillers such as silicon dioxide, kaolin, calcium carbonate, titanium dioxide, barium sulfate, and the like, either individually or as mixtures. It has proven favorable if the polyester film or at least that polyester layer of a multilayer film that is situated immediately beneath the release coating comprises particles with the mean particle diameter $d_{50}$ of not more than 5 µm, preferably not more than 4 µm, and more preferably not more than 3.5 µm. If the mean particle diameter $d_{50}$ is larger than 5 µm, the coverage of the polyester film equipped with the release coating, with micrometer-thick layers of polyacrylate varnishes in organic solvents, is uneven.

On the side facing away from the release coating, the polyester film equipped with the release coating may be applied to other substrates by lamination or by mechanical means.

Processes for Production

The polyester film of the invention may be produced by known processes, as are described, for example, comprehensively in Encyclopedia of Polymer Science and Engineering, volume 12, second edition, 1988, e.g., pages 193-216, or PET Packaging Technology, edited by David W. Brooks and Geoff A. Giles, Sheffield Academic Press 2002 (ISBN 0-8493-9786-3), e.g., pages 116-157. The coating dispersion may be applied to the unpretreated film or to pretreated polyester film. The most widespread, and particularly preferred, is a conventional corona pretreatment for improving the adhesion between the film surface and the release coating. Corona intensities generating a free surface energy of the polyester film $\sigma_s$ (total) of greater than 50 mN/m, or 50-56 mN/m, are typically sufficient for effective adhesion of the coating. Chemical adhesion promoters (primers) or interlayers may also be used. Inline coating of the polyester film, where the coating is applied to the film surface during the film production process and before film setting, is the preferred coating technique for economic reasons. The polyester film is typically coated after the corona treatment between longitudinal and transverse stretchings. The coating dispersion may be applied to one or both sides of the polyester film. Crosslinking of the inline-applied coating dispersion takes place preferably in the setting step within film production, typically at temperatures of 190-240° C. In addition to inline coating, the coating dispersion may also be applied offline (i.e., after the production and heat setting of the film substrate). Conventional coating methods include applicator roll, reverse roll coating, engraved roll, reverse engraved roll, wire-wound bar (Mayer bar coating), spray coating, airbrush coating, meniscus coating or dip coating.

Test Methods

SV (Standard Viscosity) of the PET Raw Material RM

The standard viscosity in dilute solution, SV, is measured in a method based on DIN 53 728 part 3 in an Ubbelohde viscometer (25±0.05) ° C. The solvent used is dichloroacetic acid (DCA). The concentration of the dissolved polymer is 1 g polymer/100 ml pure solvent. The polymer is dissolved for 1 hour at 60° C. From the relative viscosity ($\eta_{rel}=\eta/\eta_s$), the dimensionless SV is ascertained as follows:

SV=($\eta_{rel}$−1)×1000

O/C Ratio in a Polyolefin Wax

Commercial polyolefin wax dispersion is diluted with distilled water to the solids content of 3% by weight. 20 ml of the aqueous dispersion are dried in an aluminum dish in a drying cabinet with circulating air at 130° and evacuated further in a vacuum cabinet at 100° C. for 1 hour at <1 Pa. The elemental composition of the dried sample is measured using energy-dispersive X-ray spectroscopy (EDX) with an Apollo SSD detector from EDAX (Ametek). The EDX detector is within a Supra 35 FE-SEM electron microscope (Zeiss). The measurement takes place without further sample preparation in a low vacuum (10-50 Pa), using a 60 µm aperture. The cathode voltage is 5 kV and the sample spacing is 10 mm. The determination of the elements takes place on the following lines: carbon $K\alpha(C)=0.277$ keV, and oxygen $K\alpha(O)=0.525$ keV. The elemental composition is measured at 3 random sites on the sample, and the mean of the measurements is formed. The result reported is the O/C ratio, where O denotes the oxygen content in atomic % and C the carbon content in atomic %.

Contact Angle Measurement of 3 Standard Liquids

As a measure of the chemical composition of the film surface with the release coating, a measurement is made of the static contact angle between the film surface and the tangent of the surface contour of a drop of liquid, in accordance with DIN 55660-1,2, using three standard liquids and the following metering needles:

TABLE I

Parameters of the surface tension for three standard liquids.

| Liquid | Metering needle | Surface tension [mN/m] | | |
| --- | --- | --- | --- | --- |
| | | $\sigma_L$ (total) | $\sigma_{L,D}$ (disperse) | $\sigma_{L,P}$ (polar) |
| Distilled water | NE44 | 72.8 | 21.8 | 51.0 |
| 1,5-Pentanediol | NE45 | 43.3 | 27.6 | 15.7 |
| Diiodomethane | NE44 | 50.8 | 49.5 | 1.3 |

For measurement on drops lying horizontally, the DSA-100 instrument from Krüss GmbH with domed sample table adapter ST08 and the Advance software, version 4 is used. The determination takes place at 23° C.±1° C. and 50% relative humidity on film samples discharged and conditioned under standard conditions for at least 16 hours beforehand. An automated metering syringe is used to apply a drop of the standard liquid with a volume of 3-5 µl to the film surface. Over a time of 20 seconds, the contact angle is determined automatically every 5 seconds. For each liquid, measurement is made on 4 drops, and the mean of the contact angle for each liquid is formed from the 16 individual results.

The contact angles measured for the three standard liquids are used to calculate the free surface energy $\sigma_s$ and its disperse and polar components $\sigma_{s,D}$ and $\sigma_{s,P}$ by the method of Owens-Wendt-Rabel-Kaelble—see W. Rabel, Einige Aspekte der Benetzungstheorie und ihre Anwendung auf die Untersuchung und Veränderung der Oberflacheneigenschaften von Polymeren [Some aspects of wetting theory and their application to investigating and modifying the surface properties of polymers], in: Farbe und Lack 77, 10 (1971), pages 997-1005. The values of the surface tension $\sigma_L$ and its disperse and polar components $\sigma_{L,D}$ and $\sigma_{L,P}$ that are needed for the calculation are specified for the three standard liquids in table I.

Contact Angle of the Pure Solvent or Solvent Mixture

The measurement takes place according to the same procedure as for the contact angle measurement of 3 standard liquids, but using a manual 2 ml metering syringe (Omnifix, B. Braun Melsungen AG) with the NE44 metering needle. The drop volume is 3-5 µl. The software is programmed to determine the contact angle automatically every 29 ms within 3 seconds after the placement of the drop (103 data points). The measurement is carried out in 3 drops and the mean of the results is formed. The repeatability of the contact angle measurement is typically better than ±0.5°. Contact angle results which are unstable and show poor repeatability are an indicator of reaction between the solvent and the release coating. In the case of very low contact angles of less than 5°, complete wetting of the surface without formation of drops (spreading) may occur, depending on the nature of the surface and the speed with which the drop is placed. In these instances, the measurement is repeated.

Setoff of the Dried Release Coating

In order to test the transfer of the dried release coating to the reverse face of the film wound under tension, the setoff spectrum of the coating is measured using a Frontier (Perkin Elmer) ATR/FTIR spectrometer with the Spectrum software in version 10.4.2. The coated side of the film for measurement is pressed using the rotatable shoe (mounted tip L120-2049) against the ATR crystal. The pressing pressure is 80 (units in the Spectrum software). The film sample is subsequently removed and the spectrum of the setoff left behind on the ATR crystal is measured in the wavenumber range 650-4000 cm$^{-1}$ against air. The result of the measurement is classified, according to the intensity of the setoff spectrum, in three categories:

no setoff=the log 10 absorbance of the highest peak in the setoff spectrum is smaller than $5\cdot10^{-4}$;
weak setoff=the log 10 absorbance of the highest peak in the setoff spectrum is between $5\cdot10^{-4}$ and $1.5\cdot10^{-3}$;
severe setoff=the log 10 absorbance of the highest peak in the setoff spectrum is greater than $1.5\cdot10^{-3}$.

Wettability of the Polyacrylate Coating

A 27.5% by weight solution of polymethyl methacrylate (Elvacite 2008, Lucite International, Newton Aycliffe, UK) in MEK is applied, using a 5 µm wire-wound bar, to the dried release coating on the polyester film. The polyacrylate layer is dried by heating of the coated film in a drying cabinet at 150° C. for 30 seconds. The dried polyacrylate coating is subsequently inspected for optical defects, and the result is classified into three categories:

good=complete and homogeneous wetting, no visible defects;
moderate=coating shows optical inhomogeneities (e.g., streaks, drops, aggregates);
poor=incomplete wetting, uncoated areas can be seen.

To increase the visibility of the quality of wetting and of the detachment, the polyacrylate solution is admixed with 1% by weight of the dye Paliogen Red Violet K5411 or Heliogen Green K 9360 (both BASF SE, Ludwigshafen).

Measurement of the Detachment Forces

A 10 cm strip of the adhesive tape TESA® 7475 PV02 (Tesa SE, Germany) with a width of 25 mm is adhered without blisters or creases to the coated side of the release film provided with the dried polyacrylate coating, with the aid of a FINAT standard pressing roller weighing 2 kg (FINAT Technical Handbook: Test methods, 8th edition, The Hague; 2009, p. 73) and without additional pressure. After a waiting time of 30 minutes, the detachment force of the release film from the polyacrylate coating in contact with the adhesive tape is measured using the Peeltester TL-2200 (Imass Inc., Accord, Mass., USA) in a 180° configuration ("T-peel"). The measuring velocity is 30 cm/min. After a 2 s contact time, approximately 200 measurements of the detachment force are collected automatically within a measuring time of 20 s and are averaged. The evolution of the detachment forces is assessed visually. Any sharp changes in the detachment force within the measuring time are reflected in a high value for the RMS standard deviation. The measurement is carried out as a 6-fold determination, and the average values of the detachment force and the RMS standard deviation are reported in [g/25 mm].

The results of measurement for the respective film specimens with the release coating are compared with the standard (uncoated, biaxially oriented PET film RNK 12 without corona pretreatment)—comparative example 1—and are classified in the following categories:

very good=detachment force<5 g/25 mm and RMS standard deviation<2 g/25 mm
good=detachment force 5-10 g/25 mm and RMS standard deviation<3 g/25 mm
moderate=detachment force 5-10 g/25 mm and RMS standard deviation 3-4 g/25 mm
poor=detachment force>10 g/25 mm and RMS standard deviation>4 g/25 mm.

Detachability of the Release Film

After the detachment force has been measured, the detachment area on the release film is inspected, and the result is classified in three categories:

complete=complete separation of the polyester film from the polyacrylate layer, no perceptible residues of the polyacrylate layer on the polyester film;
partial detachment=incomplete separation of the polyester film from the polyacrylate layer;
no detachment=no separation of the polyester film from the polyacrylate layer.

EXAMPLES

Raw Materials Used

RM_PET=polyethylene terephthalate (PET), type PET 4004 (manufacturer: Invista Resins & Fibres GmbH, Germany), SV=870; ethylene terephthalate content about 99 mol %. No additives.

MB=masterbatch of 98.5% by weight PET 4004 and 1.5% by weight amorphous $SiO_2$, type Sylobloc 46 (manufacturer: Grace GmbH, Worms, Germany); mean particle diameter $d_{50}$ according to data sheet 2.9-3.5 µm.

Release Film Production

A coextruded, biaxially oriented (hereinafter bo), three-layer polyester film of ABA structure was produced, with the base layer (B) consisting of the raw material RM_PET and the two outer layers consisting of a raw material mixture of 99% by weight RM_PET and 1% by weight MB. The raw material RM_PET of the base layer (B) was melted in a twin-screw extruder with devolatilization (main extruder). The raw material mixture (RM_PET and MB) of the outer layers (A) was melted in each case in a twin-screw extruder with devolatilization (coextruder). The melt flows were converged in a flat die and solidified on a chill roll to form an amorphous film, which was thereafter stretched longitudinally on a roll stretching unit at 110° C. with a stretching ratio of 3.5:1. The longitudinally stretched film was corona-treated in a corona unit (Enercon Industries) with an intensity of 6 W·min/m$^2$. The longitudinally stretched film was subsequently coated on the corona-treated film side with the aqueous dispersion of the release coating, using a reverse engraved roll. The wet application rate was 2.7 g/m$^2$. Using a tenter frame, the one-sidedly coated, longitudinally stretched film was subjected to transverse stretching at 110° C. with a transverse stretching ratio of 3.8:1, heat-set at 230° C. for 5 s, and then rolled up. The aqueous coating on the film was dried and crosslinked during passage through the tenter frame. The total film thickness of the final film was 12 µm, with the base layer having a thickness of 10 µm and the outer layers (A) a thickness of 1 µm each. The fraction of $SiO_2$ antiblocking agent (Sylobloc 46) in the outer layers was 0.1% by weight in each case (based on the respective outer layer).

Coating Components

TABLE II

Coating components.

| Component | Designation | Manufacturer | Solids content per data sheet [%] | O/C ratio [At %] |
|---|---|---|---|---|
| Polyolefin wax | Aquacer 1547 | BYK-Chemie GmbH | 25 | 6.2 |
|  | EIF1312.E | Michelman | 24 | 9.6 |
| Crosslinker | Cymel 303 LF | Cytec Industries B.V. | 98 |  |
|  | Eastek 1100 | Eastman | 33 |  |
|  | Epocros WS-700 | Nippon Shokubai | 25 |  |
|  | Xiameter OFS 6020 | Dow Corning | 98 |  |
| Silicone-containing component | Aqua Release 470 V67 | Jost Chemicals GmbH | 7.5 |  |
| Additive | Defoamer E |  | 100 |  |

Comparative Films

RNK 12-=Standard uncoated bo-PET film (Mitsubishi Polyester Film GmbH), film thickness=12 μm, no corona pretreatment RN 23 215KN=Siliconized bo-PET film (Mitsubishi Polyester Film GmbH), film thickness=23 μm RN 23 2PRK=Siliconized bo-PET film (Mitsubishi Polyester Film GmbH), film thickness=23 μm

TABLE III

Examples - Metered amounts of components and solids content of the aqueous release coating dispersions.

| Example | Water | Polyolefin wax | Crosslinker | Silicone-containing component | Additive | Solids content of aqueous release coating dispersion [% by weight] |
|---|---|---|---|---|---|---|
| Comparative example 1 (RNK 12 -) | — | — | — | — | — | — |
| Comparative example 2 (RN 23 215KN) | — | — | Silane | Polysiloxane | — | — |
| Comparative example 3 (RN 12 2PRK) | — | — | Silane | Polysiloxane | — | — |
| Comparative example 4 | Deionized water (96.94%) | — | Xiameter OFS 6020 (3.06%) | — | — | 3.0 |
| Comparative example 5 | Deionized water (60%) | — | — | Aqua Release 470 V67 (40%) | — | 3.0 |
| Comparative example 6 | Deionized water (79.29%) | — | Xiameter OFS 6020 (2.04%) | Aqua Release 470 V67 (18.67%) | — | 3.4 |
| Comparative example 7 | Deionized water (85.75%) | — | Eastek 1100 (7.58%) | Aqua Release 470 V67 (6.67%) | — | 3.0 |
| Comparative example 8 | Deionized water (88%) | Aquacer 1547 (12%) | — | — | — | 3.0 |
| Comparative example 9 | Deionized water (89.49%) | Aquacer 1547 (10%) | Xiameter OFS 6020 (0.51%) | — | — | 3.0 |
| Comparative example 10 | Deionized water (82.52%) | Aquacer 1547 (10%) | Xiameter OFS 6020 (0.82%) | Aqua Release 470 V67 (6.67%) | — | 3.8 |
| Comparative example 11 | Deionized water (66.67%) | Aquacer 1547 (20%) | — | Aqua Release 470 V67 (13.33%) | — | 6.0 |
| Example 1 | Deionized water (83.23%) | Aquacer 1547 (10%) | Cymel 303 LF (0.1%) | Aqua Release 470 V67 (6.67%) | — | 3.1 |
| Example 2 | Deionized water (75.92%) | EIF1312.E (16.67%) | — | Aqua Release 470 V67 (6.67%) | Defoamer E (0.75%) | 5.3 |

TABLE III-continued

Examples - Metered amounts of components and solids content of the aqueous release coating dispersions.

| | Metered amounts of components [% by weight] | | | | Solids content of aqueous release coating dispersion [% by weight] |
|---|---|---|---|---|---|
| Example | Water | Polyolefin wax | Crosslinker | Silicone-containing component | Additive | |
| Example 3 | Deionized water (81.08%) | E1F1312.E (16.67%) | Epocros WS-700 (2%) | — | Defoamer E (0.25%) | 4.8 |
| Example 4 | Deionized water (62.17%) | EIF1312.E (33.33%) | Epocros WS-700 (4%) | — | Defoamer E (0.5%) | 9.5 |

TABLE IV

Examples - Properties of the polyester films with the release coatings.

| | Surface energy of dried release coating [mN/m] | | | Setoff of dried release coating | Contact angle of pure MEK [deg] | Film wettability with 27.5% polyacrylate solution in MEK | Dried polyacrylate coating (130° C., 30 s) | | | |
|---|---|---|---|---|---|---|---|---|---|---|
| Example | $\sigma_S$ (Total) | $\sigma_{S.D}$ (Disperse) | $\sigma_{S.P}$ (Polar) | | | | Detachment force with Tesa 7574 [g/25 mm] | RMS [g/25 mm] | Evaluation of detachment force with Tesa 7574 | Detachment quality |
| Comparative example 1 (RNK 12 -) | 42.7 | 39.7 | 6.2 | None | 5.7 | Good | 10.4 | 4.2 | Poor | Complete * |
| Comparative example 2 (RN 23 215KN) | 12.2 | 9.2 | 3.0 | None | 15.0 | Poor | 1.9 | 0.5 | Very good | Complete |
| Comparative example 3 (RN 12 2PRK) | 14.0 | 12.1 | 2.0 | None | 13.6 | Poor | 1.7 | 0.4 | Very good | Complete |
| Comparative example 4 | 42.5 | 34.5 | 8.0 | None | 4.9 | Good | 8.0 | 3.0 | Moderate | Complete * |
| Comparative example 5 | 30.3 | 14.8 | 15.5 | None | 10.9 | Moderate | 24 | 1.8 | Poor | Complete |
| Comparative example 6 | 13.7 | 11.7 | 2.0 | None | 12.4 | Moderate | 4.7 | 0.8 | Very good | Complete |
| Comparative example 7 | 29.7 | 27.6 | 2.1 | None | 6.9 | Good | 1186 | 94 | Poor | Partial detachment |
| Comparative example 8 | 30.3 | 29.0 | 1.3 | Severe | 6.9 | Good | 12 | 4.5 | Poor | Complete * |
| Comparative example 9 | 35.3 | 14.1 | 21.3 | Severe | 14.8 | Poor | 67 | 98.9 | Poor | Partial detachment |
| Comparative example 10 | 25.6 | 21.2 | 4.4 | None | 12.5 | Moderate | 6.8 | 1.2 | Good | Complete |
| Comparative example 11 | 20.7 | 19.1 | 1.6 | Severe | 6.8 | Good | 5.4 | 1.9 | Good | Complete |
| Example 1 | 23.1 | 21.7 | 1.4 | None | 6.6 | Good | 6.3 | 2.3 | Good | Complete |
| Example 2 | 19.7 | 17.9 | 1.9 | Weak | 6.5 | Good | 3.4 | 0.7 | Very good | Complete |
| Example 3 | 27.4 | 26.7 | 0.8 | None | 3.5 | Good | 7.4 | 1.4 | Good | Complete |
| Example 4 | 29.0 | 28.7 | 0.3 | Weak | 5.4 | Good | 2.6 | 0.8 | Very good | Complete |

* Complete detachment of the polyacrylate coating, but sudden change in the detachment force

What is claimed is:

1. A biaxially oriented polyester film having a release coating on at least one side, wherein the release coating is the product of drying of an acrylic polymer fee aqueous coating dispersion, and wherein the aqueous coating dispersion applied to the polyester film comprises the following components:

(I) 2 to 10% by weight, based on the total weight of the aqueous coating dispersion, of a polyolefin wax having an O/C ratio of 5 to 15 atomic %, where O denotes the oxygen content and C the carbon content of the polyolefin wax, and (II) 0.05 to 1.4% by weight, based on the total weight of the aqueous coating dispersion, of a crosslinker, where the mass ratio of the crosslinker to the polyolefin wax is not more than 1:7, optionally (III) 0.05 to 2.5% by weight, based on the total weight of the aqueous coating dispersion, of a silicone-containing component, where the mass ratio of the silicone-containing component to the polyolefin wax is not more than 1:4, and (IV) water for the remaining % by weight, based on the total weight of the aqueous coating dispersion, to make 100% by weight.

2. The biaxially oriented polyester film as claimed in claim 1, wherein the polyolefin wax is selected from one or more different components consisting of partially oxidized waxes based on polypropylene and/or polyethylene.

3. The biaxially oriented polyester film as claimed in claim 1, wherein the crosslinker is selected from one or more different components consisting of the following: oxazoline-based crosslinkers, hydrolyzable silanes, and melamine-based crosslinkers.

4. The biaxially oriented polyester film as claimed in claim 1, wherein the silicone-containing component is selected from one or more different components consisting of the following: synthetic resins and siloxanes which comprise 3-(polyoxyethylene)propylheptamethyltrisiloxane and/or methylvinylsiloxane and/or methylhydrogensiloxane groups.

5. The biaxially oriented polyester film as claimed in claim 1, wherein the aqueous coating dispersion further comprises an additive selected from the group consisting of alcohols, amines, surfactants, defoamers, stabilizers, pH buffers or a combination thereof, in a total concentration of up to 2.1% by weight, based on the total weight of the aqueous coating dispersion.

6. The biaxially oriented polyester film as claimed in claim 1, wherein the solids content of the coating dispersion is 2.05 to 16% by weight, based on the total weight of the aqueous coating dispersion.

7. The biaxially oriented polyester film as claimed in claim 1, wherein the polyester film has a thickness of 4.5 μm to 500 μm.

8. The biaxially oriented polyester film as claimed in claim 1, wherein the polyester film is a one-layer or multilayer biaxially oriented polyester film which consists of at least 80% by weight of thermoplastic polyester, based on the total weight of the uncoated polyester film.

9. The biaxially oriented polyester film as claimed in claim 8, wherein the polyester film has a thickness of 4.5 μm to 500 μm.

10. The biaxially oriented polyester film as claimed in claim 8, wherein the one-layer polyester film or at least one outer layer of the multilayer polyester film directly beneath the release coating comprises particles having a mean particle diameter $d_{50}$ of not more than 5 μm.

11. A biaxially oriented polyester film having a release coating on at least one side wherein:
the wetting angle between the coated film surface and a solvent or solvent mixture applied thereto for a polyacrylate is <10°, the free surface energy $\sigma_s$ (total) and its disperse and polar components $\sigma_{s,D}$ and $\sigma_{s,P}$ of the coated film surface, determined by measuring the contact angles of three standard liquids (water, 1,5-pentanediol, and diiodomethane) on the coated film surface, are
$\sigma_s$ (total): 15 to 30 mN/m,
$\sigma_{s,D}$ (disperse): 15 to 30 mN/m,
$\sigma_{s,P}$ (polar): ≤2.0 mN/m.

12. The biaxially oriented polyester film as claimed in claim 1, wherein the polyester raw material is melted in one or more extruders, extruded through a flat film die onto a takeoff roll, taken off, and then simultaneously or sequentially stretched longitudinally and transversely, set, and then wound up, where said aqueous coating dispersion is applied inline to one or more film surfaces prior to setting.

13. The use of a biaxially oriented polyester film as claimed in claim 1 as a release film fir applying thin polyacrylate layers from organic solvents by a printing process.

14. The use of a biaxially oriented polyester film as claimed in claim 1 in the casting of decorative layers for applications in the advertising, packaging, automobile, furniture and/or machine industry.

15. A biaxially oriented polyester film having a release coating on at least one side, wherein the release coating is the product of drying of an acrylic polymer free aqueous coating dispersion, and wherein the aqueous coating dispersion applied to the polyester film comprises the following components:

(I) 2 to 10% by weight, based on the total weight of the aqueous coating dispersion, of a polyolefin wax having an O/C ratio of 5 to 15 atomic %, where O denotes the oxygen content and C the carbon content of the polyolefin wax, and (II) 0.05 to 1.4% by weight, based on the total weight of the aqueous coating dispersion, of a crosslinker selected from one or more components consisting of the following: oxazoline-based crosslinkers and hydrolyzable silanes where the mass ratio of the crosslinker to the polyolefin wax is not more than 1:7, and (III) the one-layer polyester film or at least one outer layer of a multilayer polyester film directly beneath the release coating having particles with a mean particle diameter $d_{50}$ of not more than 5 μm, optionally (IV) 0.05 to 2.5% by weight, based on the total weight of the aqueous coating dispersion, of a silicone-containing component, where the mass ratio of the silicone-containing component to the polyolefin wax is not more than 1:4, and (V) water for the remaining % by weight, based on the total weight of the aqueous coating dispersion, to make 100% by weight.

* * * * *

UNITED STATES PATENT AND TRADEMARK OFFICE
CERTIFICATE OF CORRECTION

PATENT NO. : 11,059,276 B2  
APPLICATION NO. : 16/299458  
DATED : July 13, 2021  
INVENTOR(S) : Kolar et al.

Page 1 of 1

It is certified that error appears in the above-identified patent and that said Letters Patent is hereby corrected as shown below:

In the Claims

Column 13,  
Claim 1, Line 59, delete "fee" and insert --free--

Column 16,  
Claim 13, Line 14, delete "fir" and insert --for--

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*